Patented Mar. 16, 1937

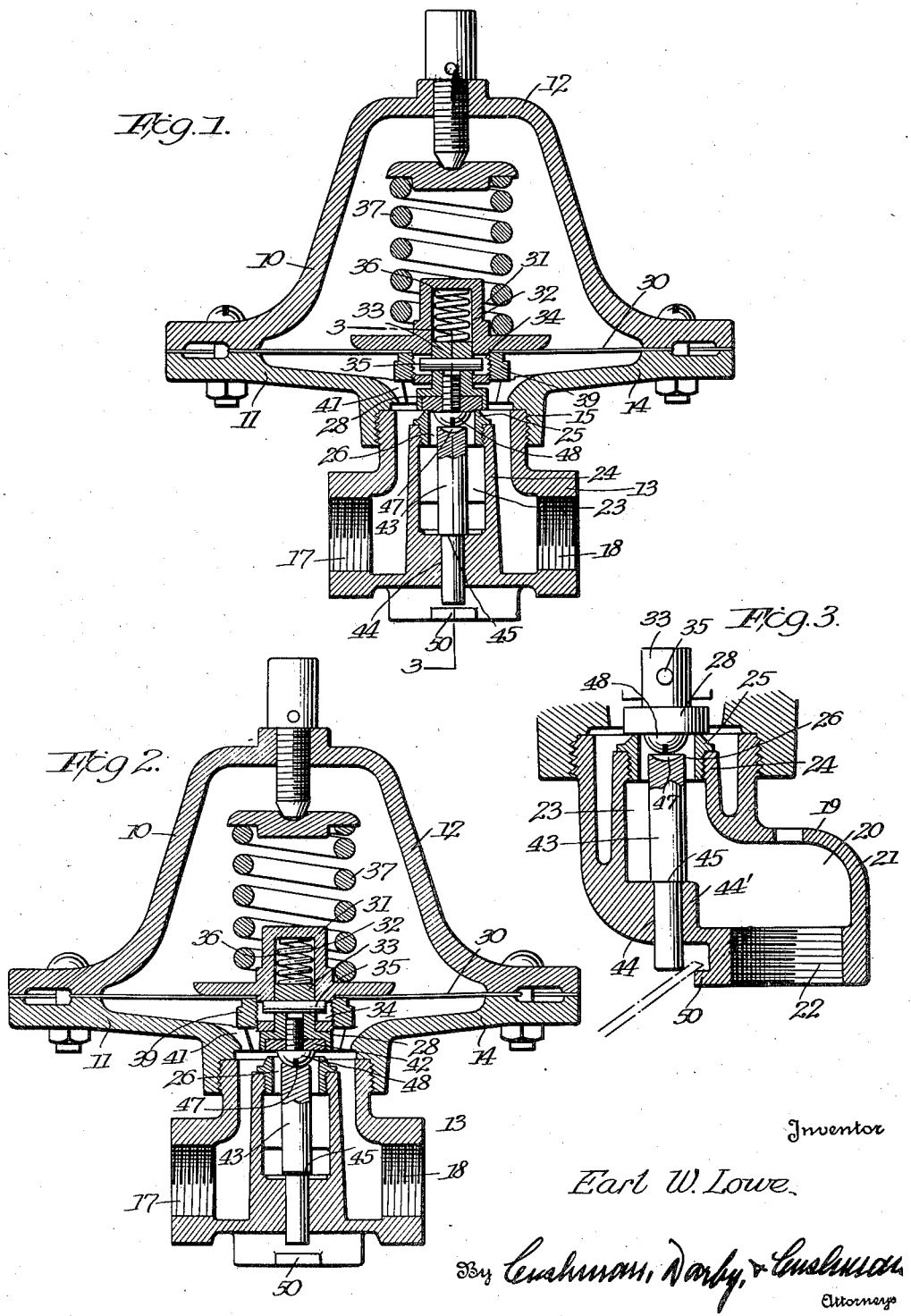

2,074,268

UNITED STATES PATENT OFFICE 2,074,268

RELIEF VALVE AND TESTING DEVICE

Earl W. Lowe, Decatur, Ill., assignor to Mueller Co., Decatur, Ill., a corporation of Illinois Application July 31, 1934, Serial No. 737,347

1 Claim. (Cl. 137—53)

The present invention relates to relief valves, and, particularly, a valve adapted for use in a fluid line to relieve the same upon the occurrence of excessive pressure, and has for its objects to provide a relief valve which may be unseated manually to ascertain if the valve is stuck or to relieve the pressure in the line.

In the drawing herewith is shown one form of the invention, but it will be understood that the drawing is illustrative and in no sense restrictive, as the invention may be developed in various mechanical ways.

In the drawing:—

Figure 1 is a vertical sectional view of the valve, showing the same in normal seated position.

Figure 2 is a vertical sectional view of the valve, showing the valve member lifted from its seat by the manual lifting device.

Figure 3 is a partial vertical sectional view along the line 3—3 of Figure 1.

Referring to the drawing by numerals, like numerals designating like parts throughout the several views, 10 indicates the valve casing, said casing comprising a body member 11 and a bonnet 12. The body member is composed of a lower portion 13 and a flanged portion 14, said portions being fitted together by means of the screw threads shown at 15. The lower portion 13 of the body member 11 is adapted to be inserted into a fluid pressure line, and when inserted, an opening 17 in the body member may constitute an inlet to the body member, while an opening 18 may constitute an outlet from the body member. That is, when the body member is inserted into the fluid pressure line, the fluid will flow through the same in its normal direction, but may be relieved upon the occurrence of excessive pressure in a manner which will be hereinafter described.

Referring to Figure 3, it will be observed that the lower portion of the body member has integral therewith an extension 19 which defines an outlet or waste passage 20. The extension 19 is offset and projects from the lower portion of the body member at approximately right angles to the direction of the inlet and outlet passages 17 and 18, and said extension has a downward substantially right angle bend as at 21, the lower end of said extension having a screw-threaded opening 22 for the reception of the end of a discharge line to carry away the fluid which has been vented through the valve.

The inner end of the waste passage extends centrally up into the body member as at 23, the inner end of the passage being defined by an interior upstanding cylindrical portion 24 of the body member, the latter being interiorly screw-threaded to receive a valve seat 25. The fluid way 26 formed by the valve seat is normally closed by a valve member 28, said valve member being held upon its seat against the pressure in the line in a manner which will be later described.

To regulate the opening of the valve in response to pressure in the fluid line, a diaphragm 30 is provided, said diaphragm being clamped between the body member 11 and the bonnet 12 in a well-known manner. The diaphragm is centrally apertured to receive a hollow cup-shaped guiding sleeve 31, said sleeve extending above the diaphragm and being provided with a guiding recess 32. The valve member 28 has integral therewith a valve stem 33 which extends into the guiding recess 32. A pair of diametrically opposed openings or recesses 34 are provided in the lower part of the guiding sleeve, said openings being adapted to receive the ends of a pin 35, which is integral with the valve stem 33. It will be noted that the diameter of the pin 35 is substantially less than the diameter of the openings 34. Disposed above the valve stem and between the upper end of the same and the ceiling of the guiding sleeve is a secondary spring 36, which exerts pressure to normally maintain the valve member upon its seat when the diaphragm is in the normal position.

Disposed above the diaphragm is the usual loading spring 37, the pressure of which tends to force the diaphragm downwardly until a retaining nut 39 carried on the lower face of the diaphragm abuts against stop lugs 41, the latter being integral with the body member and disposed around and above the valve seat. As shown in Figure 1, when the loading spring forces the diaphragm down until the retaining nut 39 abuts against the stop lugs 41, the valve stem pin 35 will be in substantially the center of the recesses 34 in the guiding sleeve, and by reason of this position, the valve member will be held upon its seat solely by the pressure of the secondary spring 36. Thus, the soft packing insert 42 of the valve member will not be distorted as it would be if it took the relatively great pressure of the loading spring.

In operation, the fluid in the line passes up into the valve body member and between the stop lugs 41 and contacts the lower surface of the diaphragm. When minor fluctuations of pressure occur in the line, the diaphragm, by reason of the lost motion connection with the valve stem, may move upwardly a slight distance without carrying the valve member from its seat. However, when a sustained high pressure occurs, the lost motion will be taken up and the valve member will be removed from its seat against the pressure of the loading spring 37.

A valve of the above description and operation is described and claimed in the copending application of James M. Wilkins for a Relief valve, Serial No. 722,577, filed April 26, 1934, and the present invention relates to improvements for a valve of this character as set forth in detail below.

In order to ascertain if the valve member has become stuck to its seat, or to provide a convenient means for venting the fluid line by hand, a valve actuating pin 43 is centrally disposed within the waste passage 23 of the lower body member, said pin being loosely and slidably carried within a bearing aperture 44 which extends through the bottom of said passage, the outer end of the pin extending outside of the casing. In order that the pin may be properly supported against lateral movement, so that it will be retained centrally below the valve member, the lower wall of the waste passage is thickened interiorly to form a ledge 44', so that the bearing aperture 44 will be relatively extensive in length. The upper portion of the valve actuated pin is of greater diameter than the lower portion, and where these portions meet, a shoulder 45 is formed, said shoulder resting upon the ledge 44' when the valve is seated, as shown in Figures 1 and 3. The valve actuating pin is of such length that when it has been restored by gravity to the position of Figures 1 and 3, the upper end of the pin will be a sufficient distance below the lower surface of the valve member so that there will be no possibility of the latter being prevented from firmly engaging its seat. The upper end of the valve actuating pin is provided with a concave engaging surface 47, this surface being semi-spherical in shape and being adapted for engagement with the convex surface of a screw 48 which is threaded into the lower end of the valve member, said screw constituting the valve member engaging surface. The spherical surfaces 47 and 48 are concentric, so that when the valve actuating pin is manually pressed upwardly, the engagement of the concentric spherical surfaces will insure that the force is applied at the exact center of the valve member, this being desirable in order that there may be no lateral forces which might tend to raise the valve from its seat on one side, while allowing it to remain stuck to the seat on the other side. While I have shown the engaging surface of the valve actuating pin as being concave, and the engaging surface of the valve member as being convex, it is obvious that this arrangement might be reversed.

On the bottom of the body member adjacent to the outside extension of the valve actuating pin, a ledge 50 is provided. This ledge is used to facilitate the hand operation of the valve by serving as a fulcrum upon which a suitable lever such as a screw driver may be rested, in the manner shown in Figure 3. By this construction, and when the end of the lever is fulcrumed on the ledge 50, the valve actuating pin may be elevated until the surface 47 engages the surface 48, after which further movement will lift the valve from its seat. It will be noted that by reason of the lost motion connection between the valve stem and the guiding sleeve, only sufficient pressure need be exerted upwardly against the lower end of the valve actuating pin to overcome the pressure of the secondary spring 36, and the limited movement of the valve stem upwardly against the pressure of the secondary spring until the lost motion is taken up will be sufficient to test the valve. However, if it is desired to quickly vent the line by hand, sufficient pressure exerted on the lower end of the valve actuating pin will lift the valve member and the diaphragm against the loading spring to more completely open the fluid way 26 leading into the waste chamber 23.

When the manual pressure is released from beneath the valve actuating pin, the latter will return to the normal position shown in Figure 1, by reason of the force of the secondary spring 36, and by gravity.

It will be apparent that this invention affords a convenient arrangement for testing valves of this character, and that the construction precludes the possibility of the hand releasing means jamming and holding the valve in open position. That is, due to the simplicity of the construction and the absence of any connected external mechanisms to lift the valve actuating pin, there is no danger of mis-operation of the same which might result in retaining the valve actuating pin in its elevated position, thus jamming the valve open. For the same reasons, there is little likelihood of an inexperienced person tampering with the hand release arrangement. Furthermore, due to the fact that the hand release mechanism will remain in operation only when an attendant is present holding the valve actuating pin in elevated position, there is no possibility of the valve remaining off its seat after the attendant has departed.

Such departure from the construction herein disclosed as amounts only to mechanical skill, may be made without departing from the range of the invention.

I claim:

A relief valve including a casing having a fluid inlet and a waste passage, a valve for said passage, a normally closed valve member for said seat controlling the waste passage, a fluid pressure actuated diaphragm in said casing to open the valve on increase of pressure, a loading spring for urging said diaphragm to close said valve against fluid pressure in said casing, a guiding sleeve for said valve included in said diaphragm, said valve being mounted for limited movement with respect to said diaphragm within said sleeve, diaphragm arresting means on said casing adjacent said valve seat for limiting movement of said diaphragm under pressure of said loading spring, and an externally operable reciprocative valve actuating pin extending into said casing to engage said valve member to lift it from its seat without moving said diaphragm from said arresting means.

EARL W. LOWE.